United States Patent
Yamaoka et al.

(10) Patent No.: US 7,459,656 B2
(45) Date of Patent: Dec. 2, 2008

(54) POSITIONING JIG DEVICE FOR VEHICLE BODY FRAME

(75) Inventors: Naoji Yamaoka, Saitama-ken (JP); Teiji Miwa, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 466 days.

(21) Appl. No.: 10/550,242

(22) PCT Filed: Mar. 12, 2004

(86) PCT No.: PCT/JP2004/003256

§ 371 (c)(1),
(2), (4) Date: Sep. 23, 2005

(87) PCT Pub. No.: WO2004/085233

PCT Pub. Date: Oct. 7, 2004

(65) Prior Publication Data

US 2006/0245901 A1    Nov. 2, 2006

(30) Foreign Application Priority Data

Mar. 25, 2003    (JP)    ............................. 2003-082134

(51) Int. Cl.
 *B23K 37/04*    (2006.01)
(52) U.S. Cl. ........................................ 219/158; 901/42
(58) Field of Classification Search ................ 219/158, 219/161; 228/47.1; 901/42
See application file for complete search history.

(56) References Cited

U.S. PATENT DOCUMENTS 4,256,947 A *   3/1981   De Candia ................... 219/79
6,408,504 B2 *  6/2002   Yamaoka et al. .............. 29/709

FOREIGN PATENT DOCUMENTS

| JP | 62-238099 |   | 10/1987 |
| JP | 62-238099 A | * | 10/1987 |
| JP | 62-279098 |   | 12/1987 |
| JP | 63-260681 |   | 10/1988 |
| JP | 64-078676 |   | 3/1989 |
| JP | 02-220775 |   | 9/1990 |
| JP | 02-220776 |   | 9/1990 |
| JP | 06-329241 |   | 11/1994 |
| JP | 08-215889 |   | 8/1996 |
| JP | 2000-006862 |   | 1/2000 |
| JP | 2000-158135 |   | 6/2000 |
| JP | 2001-340962 |   | 12/2001 |
| JP | 2001-340995 |   | 12/2001 |
| JP | 2003-145364 |   | 5/2003 |
| WO | WO 00/71292 A1 | * | 11/2000 |

* cited by examiner

*Primary Examiner*—Kevin P Kerns
(74) *Attorney, Agent, or Firm*—Carrier, Blackman & Associates, P.C.; William D. Blackman; Joseph P. Carrier

(57) ABSTRACT

In a welding station, one end of a positioning jig is held by a positioning robot, and the other end of the positioning jig is held by a positioning jig holder mechanism. The positioning robot is moved for positioning and fixing a vehicle body frame, which is fixed to the positioning jig, in any attitude, and a desired welding operation is performed on the vehicle body frame.

19 Claims, 5 Drawing Sheets

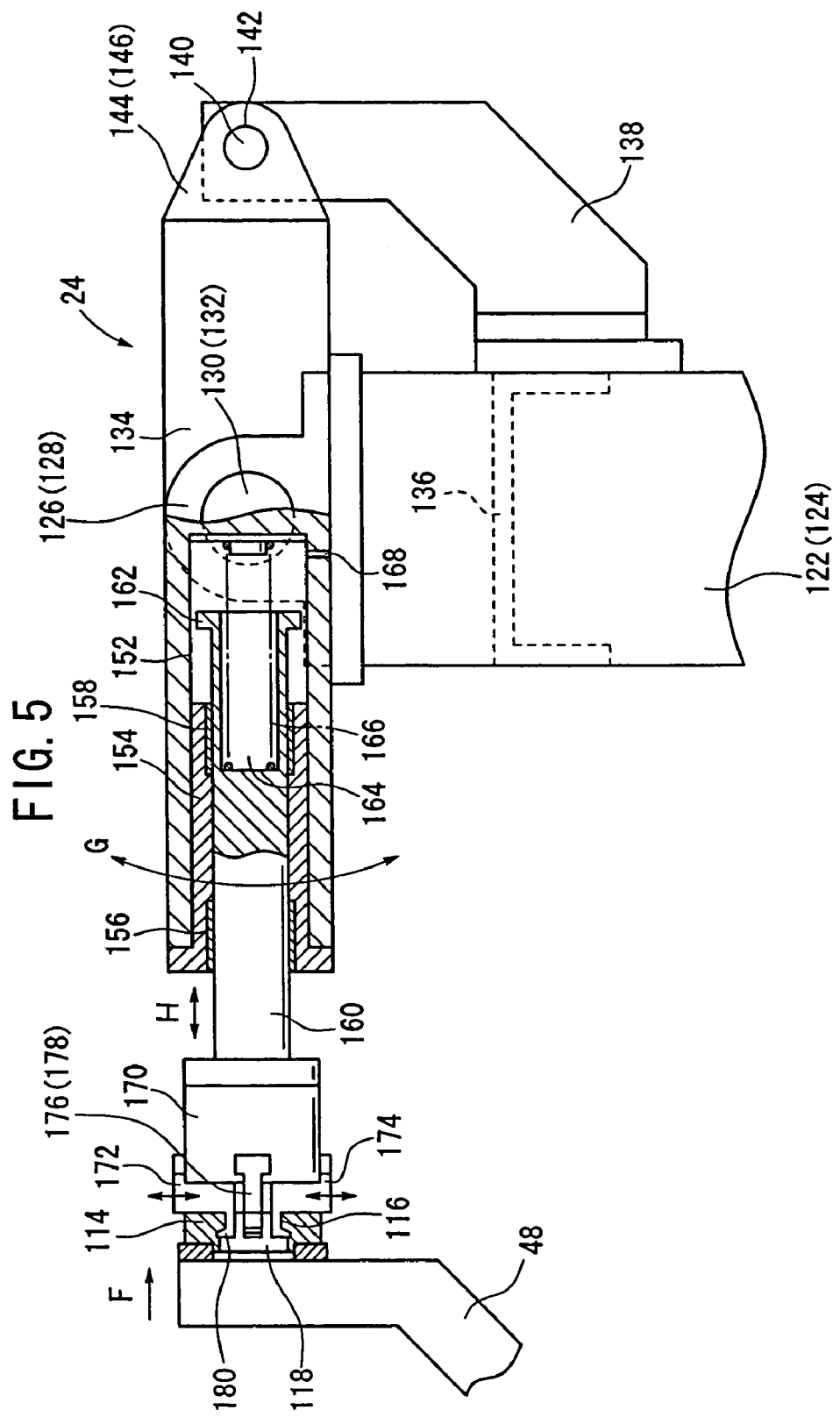

POSITIONING JIG DEVICE FOR VEHICLE BODY FRAME

CROSS-REFERENCE TO RELATED APPLICATIONS

The present invention claims priority under 35 USC 119 (a)-(d) and 365(b) based on Japanese patent application No. 2003-082134, filed on Mar. 25, 2003. The subject matter of this priority document is incorporated by reference herein.

TECHNICAL FIELD

The present invention relates to a positioning jig device for supplying a vehicle body frame to a predetermined working position and positioning and fixing the vehicle body frame.

BACKGROUND ART

Heretofore, a welding system for welding vehicle body frames, for example, has a plurality of welding stations with welding robots. Vehicle body frames are positioned on jigs, and are supplied from a workpiece feed path to the respective welding stations where the vehicle body frames are welded.

Jigs for positioning the vehicle body frames in the welding stations are required for each of the various respective vehicle body frames. The positioning relationship between the vehicle body frames supplied to the welding stations and the welding robot differs depending on the combinations of the types of the vehicle body frames and the types of the jigs and welding robots corresponding to the vehicle body frames. Therefore, it is necessary to provide as many dedicated jigs as the number of the combinations. As the number of types of vehicle body frames and the number of types of welding robots increase, more types of jigs are required, resulting in an increase in the cost of the facilities. Furthermore, since the positional relationship between each jig and each welding robot needs to be adjusted once in every two or three months, the management process for maintaining positional accuracy is complicated and troublesome.

According to a conventional arrangement disclosed in Japanese Patent No. 3351753, for example, each welding station has a positionally adjustable positioner positioning a vehicle body frame, and a vehicle body frame is supplied from a workpiece feed path to each positioner by a feed robot. The vehicle body frame is adjusted to a position and attitude depending on the welding robot and then welded by the welding robot. The positioners disposed in the respective welding stations can be commonly designed for use with the welding robots in the respective welding stations.

However, it is essential for each welding station to have its own positioner, and at least positioners of different structures depending on the types of vehicle body frames are required.

SUMMARY

It is an object of the present invention to provide a positioning jig device which is capable of highly accurately positioning a vehicle body frame using a minimum number of required positioning jigs depending upon the types of vehicle body frames only.

It is another object of the present invention to provide a positioning jig device for a vehicle body frame, which is capable of reducing the cost entailed by positioning jigs.

According to the present invention, a vehicle body frame fixed to a positioning jig which is constructed depending on the form of the vehicle body frame is supplied to a working position by a positioning robot. Then, an engaging member of a positioning jig holder mechanism engages an end of the positioning jig, and the positioning robot positions the vehicle body frame in a desired working attitude. At this time, since the positioning jig is supported by the positioning robot and the positioning jig holder mechanism, the vehicle body frame can stably be worked upon as desired with high accuracy.

The engaging member may be swingably supported and may be supported for displacement toward the positioning jig, so that the positioning jig can be set to a desired working attitude by the positioning robot.

The engaging member may be displaceable through a resilient member to absorb shocks that are produced when the positioning jig and the engaging member engage each other.

BRIEF DESCRIPTION OF THE DRAWINGS

FIG. 5 is a cross-sectional view of the welding system of FIG. 1, partly omitted from illustration, taken along line V-V of FIG. 1.

DETAILED DESCRIPTION OF THE INVENTION

Figure 1:
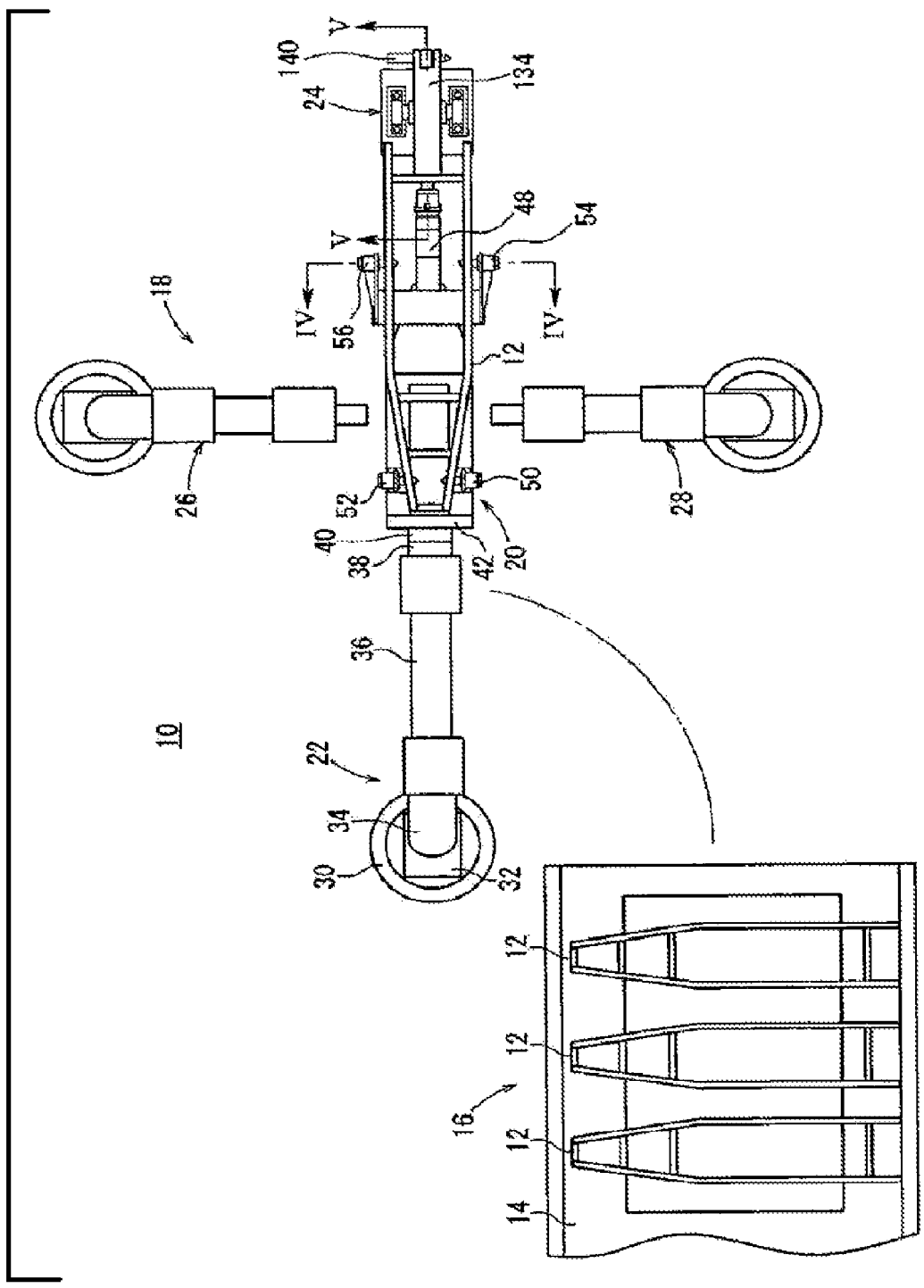
FIG. 1 is a plan view of a welding system.

FIG. 1 is a plan view of a welding system 10 incorporating a positioning jig device for a vehicle body frame according to the present invention.

The welding system 10 is a system for welding vehicle body frames 12 that are supplied in a temporarily assembled state. The welding system 10 includes a vehicle body frame placement unit 16 having a placement table 14 for placing a plurality of vehicle body frames 12 thereon, a welding station 18 for welding a vehicle body frame 12 supplied from the vehicle body frame placement unit 16, and a positioning robot 22 having a positioning jig 20 for feeding a vehicle body frame 12 from the vehicle body frame placement unit 16 to the welding station 18 and positioning the vehicle body frame 12 in the welding station 18.

The welding station 18 has a positioning jig holder mechanism 24 for holding the positioning jig 20 in cooperation with the positioning robot 22, and two welding robots 26, 28 for welding the vehicle body frame 12.

Figure 2:
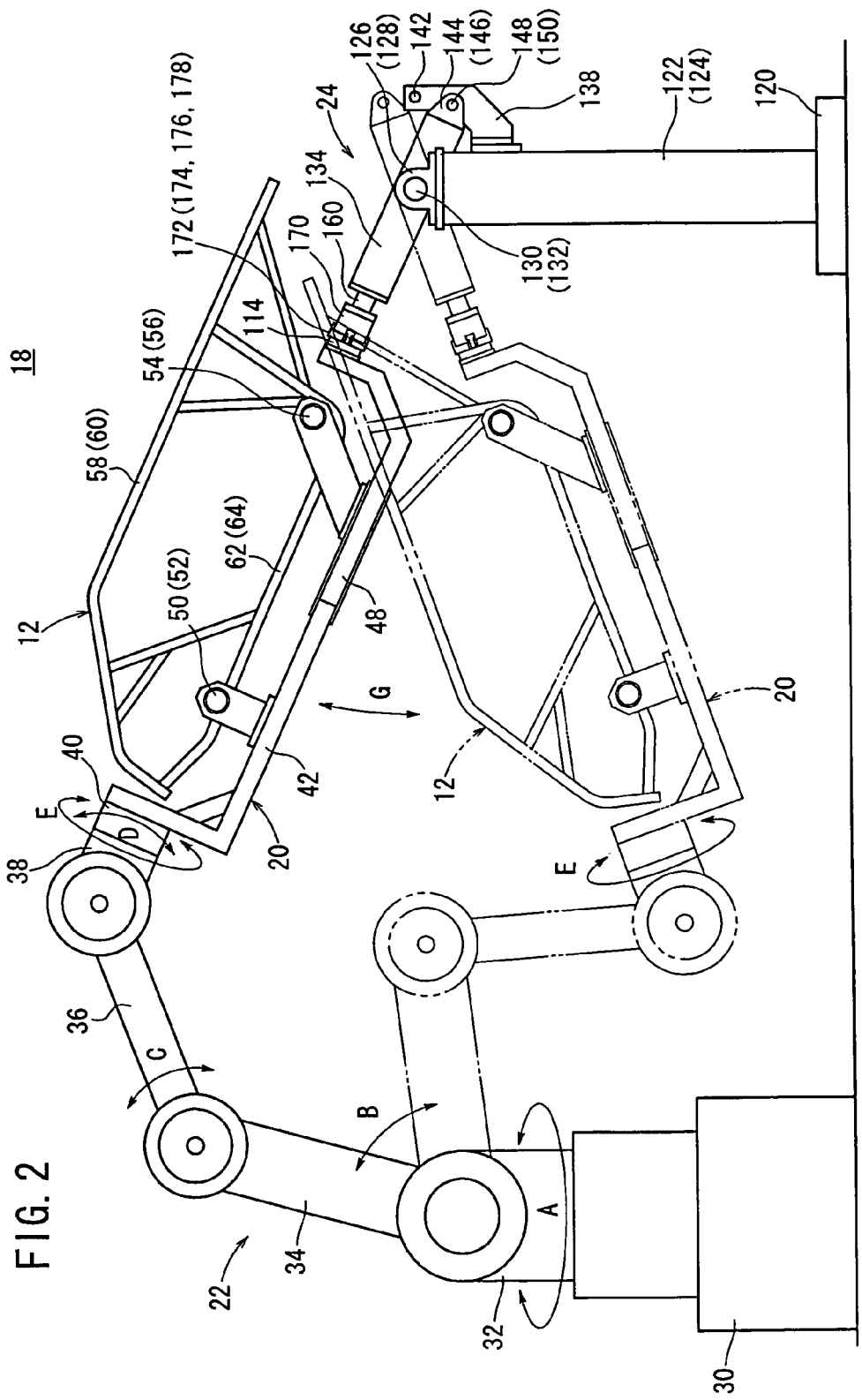
FIG. 2 is a side elevational view of the welding system of FIG. 1 showing the manner in which a vehicle body frame is positioned by a positioning robot and a positioning jig holder mechanism in a welding station.

As shown in FIG. 2, the positioning robot 22 has a first arm 32 mounted on a base 30 and rotatable in the direction indicated by the arrow A, a second arm 34 mounted on an end of the first arm 32 and rotatable in the direction indicated by the arrow B, a third arm 36 mounted on an end of the second arm 34 and rotatable in the direction indicated by the arrow C, a fourth arm 38 mounted on an end of the third arm 36 and rotatable in the direction indicated by the arrow D, and a fifth arm 40 mounted on an end of the fourth arm 38 and rotatable in the direction indicated by the arrow E. The positioning jig 20 is coupled to an end of the fifth arm 40.

Figure 3:
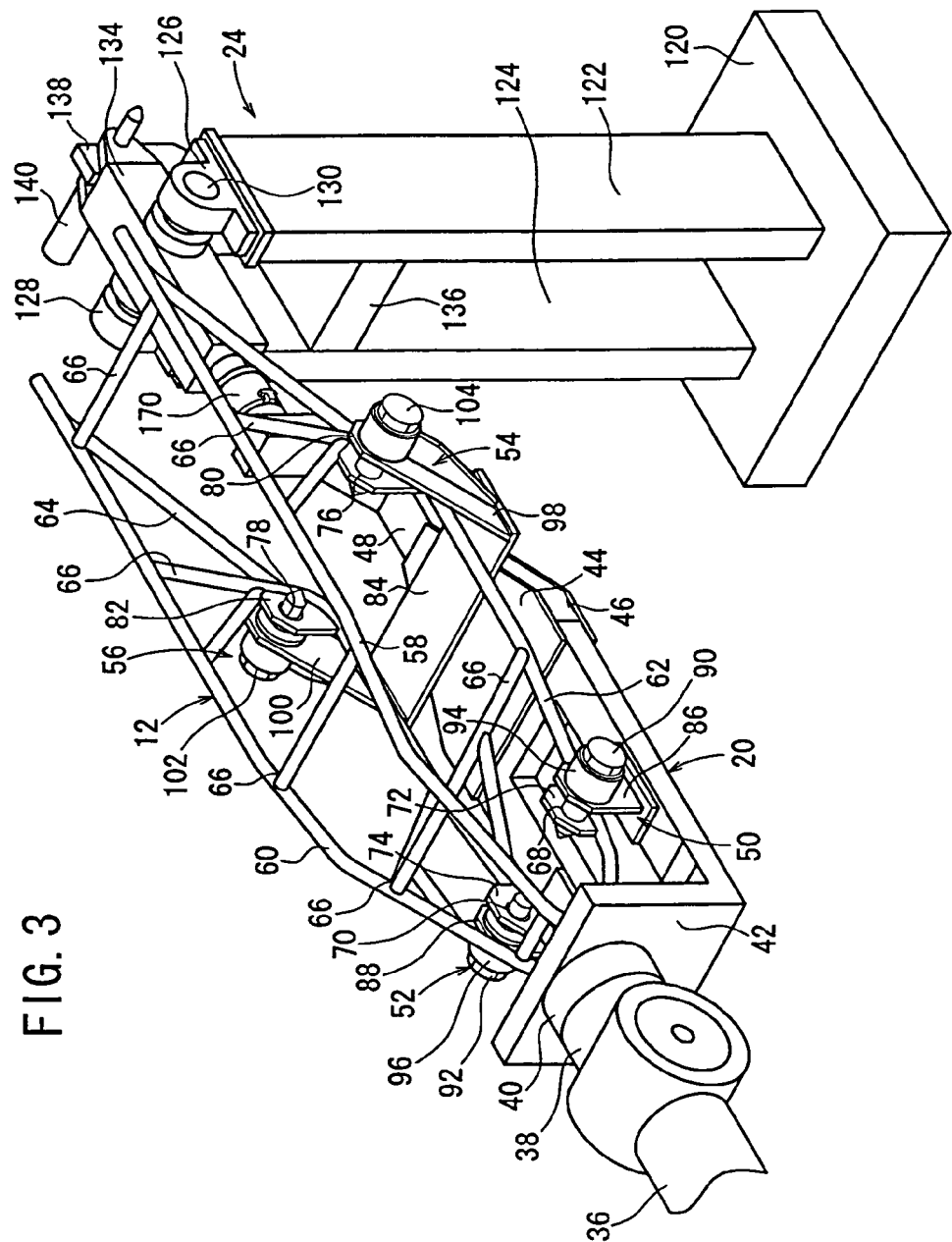
FIG. 3 is a perspective view of the welding system of FIG. 1 showing the manner in which the vehicle body frame is positioned by the positioning robot and the positioning jig holder mechanism in the welding station.

As shown in FIG. 3, the positioning jig 20 comprises a substantially L-shaped jig base 42 having an end coupled to the fifth arm 40 of the positioning robot 22, a substantially L-shaped joint arm 48 mounted on the other end of the jig base 42 by joint plates 44, 46, first securing units 50, 52 disposed on the jig base 42, and second securing units 54, 56 disposed on the upper joint plate 44.

The vehicle body frames 12 are provided for use in four-wheel buggies, for example. Each of the vehicle body frames 12 has two upper frames 58, 60, two lower frames 62, 64, and a plurality of auxiliary frames 66 interconnecting the frames 58, 60, 62, 64. Brackets 72, 74 having respective holes 68, 70 for supporting respective suspensions are disposed on respective front portions of the lower frames 62, 64. Brackets 80, 82 having respective holes 76, 78 for pivotally supporting respective ends of swing arms are disposed on respective rear portions of the lower frames 62, 64.

Figure 4:
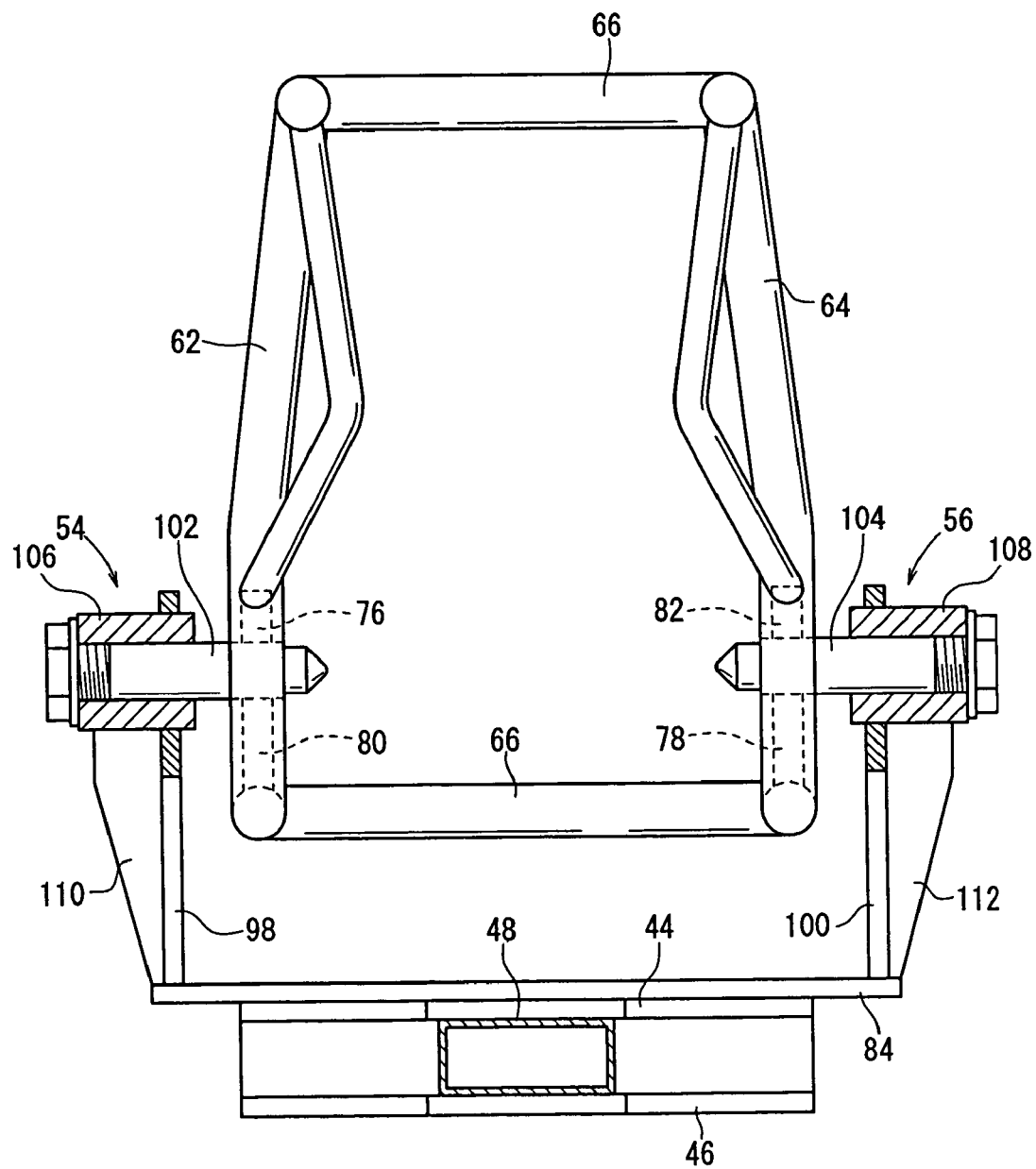
FIG. 4 is a cross-sectional view of the welding system of FIG. 1 taken along line IV-IV of FIG. 1.

The first securing units 50, 52 of the positioning jig 20 have respective brackets 86, 88 erected on the jig base 42, and respective threaded members 94, 96 disposed on respective upper portions of the brackets 86, 88, with fastening bolts 90, 92 threaded through the respective threaded members 94, 96. As shown in FIG. 4, the second securing units 54, 56 have respective brackets 98, 100 erected on respective opposite ends of a support plate 84 which is fixedly mounted on the joint plates 44, 46, and respective threaded members 106, 108 disposed on respective upper portions of the brackets 98, 100, with fastening bolts 102, 104 threaded through the respective threaded members 106, 108. Stiffener ribs 110, 112 are disposed on the respective brackets 98, 100.

An engaging member 114 is disposed on an end of the joint arm 48 of the positioning jig 20. As shown in FIG. 5, the engaging member 114 has an opening 116 and a recess 118 having an inner space that is wide relative to the recess 118.

The positioning jig holder mechanism 24 has two support posts 122, 124 erected on a base 120, bearings 126, 128 disposed on respective upper ends of the support posts 122, 124, and a support 134 rotatably supported by rotational shafts 130, 132 which are pivotally supported by the bearings 126, 128.

Upper portions of the support posts 122, 124 are interconnected by a joint plate 136. A substantially L-shaped fixed arm 138 has an end fixed to the support posts 122, 124, and has a hole 142 defined in an upper end thereof. A securing pin 140 for securing the support 134 is inserted through the hole 142.

The rotational shafts 130, 132 are disposed on respective opposite sides of a central portion of the support 134. Brackets 144, 146 between which the upper end of the fixed arm 138 extends are disposed on an end of the support 134. The brackets 144, 146 have respective holes 148, 150 defined therein, with the securing pin 140 inserted therethrough.

The support 134 has an oblong hole 152 defined in the other end thereof, and a hollow cylindrical support sleeve 154 is inserted into the oblong hole 152 from the other end of the support 134. Metal seals 156, 158 are disposed on the inner circumferential surface of the support sleeve 154, and a cylindrical rod 160 is inserted through the metal seals 156, 158 for displacement and rotation with respect to the support sleeve 154.

The rod 160 has a flange 162 on an end thereof for engaging the support sleeve 154 to prevent the rod 160 from being removed from the support sleeve 154. The rod 160 has a hole 164 defined in the end thereof and houses therein a helical spring 166 (resilient member) for normally biasing the rod 160 to move in a direction so as to project outwardly from the support 134. The support 134 has a vent hole 168 communicating with the oblong hole 152 and vented to the outer space. Air can flow through the vent hole 168 into and out of the oblong hole 152 for allowing the rod 160 to be easily displaced with respect to the oblong hole 152.

A cylinder 170 is disposed on the other end of the rod 160. The cylinder 170 is capable of rotational movement so as to drive two confronting sets of engaging members 172, 174, 176, 178 toward and away from each other in a direction substantially orthogonal to a longitudinal axis of the rod 160. The engaging members 172, 174, 176, 178 have respective teeth 180 for engaging the recess 118 defined in the engaging member 114 that is disposed on the joint arm 48 of the positioning jig 20.

The welding system 10 according to the present embodiment is basically constructed as described above. Operation of the welding system 10 will be described below.

First, the positioning jig 20 corresponding to the type of the vehicle body frame 12 is mounted on the fifth arm 40 of the positioning robot 22. Then, the positioning robot 22 is actuated to move the positioning jig 20 to the vehicle body frame placement unit 16. Thereafter, a vehicle body frame 12 which has been assembled by temporary welding is secured to the positioning jig 20.

For securing the vehicle body frame 12 to the positioning jig 20, as shown in FIG. 3, the fastening bolts 90, 92 are threaded respectively into the threaded members 94, 96 of the first securing units 50, 52 until the tip ends of the fastening bolts 90, 92 are inserted respectively into the holes 68, 70 defined in the brackets 72, 74 on the lower frames 62, 64 of the vehicle body frame 12. Similarly, as shown in FIG. 4, the fastening bolts 102, 104 are threaded respectively into the threaded members 106, 108 of the second securing units 54, 56 until the tip ends of the fastening bolts 102, 104 are inserted respectively into the holes 76, 78 defined in the brackets 80, 82 on the lower frames 62, 64 of the vehicle body frame 12.

The brackets 72, 74 are components for mounting suspensions on the vehicle body frame 12, and the brackets 80, 82 are components for mounting swing arms on the vehicle body frame 12. The vehicle body frame 12 is highly accurately positioned on and fixed to the positioning jig 20, using these brackets.

The vehicle body frame 12 may be automatically secured to the positioning jig 20 by placing the vehicle body frame 12 on the positioning jig 20 that has been moved to the vehicle body frame placement unit 16 by the positioning robot 22, using a placement robot, and threading the fastening bolts 90, 92, 102, 104 using a nut runner or the like that is actuated by a servomotor.

After the vehicle body frame 12 has been secured to the positioning jig 20, the positioning robot 22 is actuated again to feed the vehicle body frame 12 together with the positioning jig 20 to the welding station 18. At this time, as shown in FIG. 5, the securing pin 140 is inserted into the holes 148, 150 in the end of the support 134 through the hole 142 in the fixed arm 138 to keep the support 134 of the positioning jig holder mechanism 24 horizontal in the welding station 18. The cylinder 170 of the positioning jig holder mechanism 24 is actuated to bring the engaging members 172, 174, 176, 178 toward each other.

The positioning robot 22 is actuated to displace the engaging member 114 disposed on the end of the joint arm 48 of the positioning jig 20 in the direction indicated by the arrow F in FIG. 5 until the teeth 180 of the engaging members 172, 174, 176, 178 of the positioning jig holder mechanism 24 are inserted into the recess 118 in the engaging member 114. At this time, since the rod 160 which supports the engaging members 172, 174, 176, 178 is displaceable in the directions indicated by the arrow H by the helical spring 166 disposed in the oblong hole 152 in the support 134, shocks produced when the engaging member 114 and the engaging members 172, 174, 176, 178 engage each other are absorbed.

Then, the cylinder 170 is actuated to separate the engaging members 172, 174, 176, 178 by moving them away from each other, whereupon the teeth 180 engage the engaging member 114 to join the end of the positioning jig 20 to the support 134. As a result, the positioning jig 20 to which the vehicle body frame 12 is fixed has one end held by the positioning robot 22 and the other end by the positioning jig holder mechanism 24. Thereafter, the securing pin 140 is removed from the brackets 144, 146 of the support 134, allowing the support 134 to swing about the rotational shafts 130, 132 in the directions indicated by the arrow G.

Then, the positioning robot 22 moves the first arm 32, the second arm 34, the third arm 36, the fourth arm 38, and the fifth arm 40 to set the vehicle body frame 12 to a desired attitude in the welding station 18. At this time, because the rod 160 of the positioning jig holder mechanism 24 moves in the directions indicated by the arrow G, or turns about the support sleeve 154, or is displaced with respect to the support sleeve 154 as the positioning robot 22 moves, the positioning robot 22 can easily set the vehicle body frame 12 to a desired attitude.

After the vehicle body frame 12 has been positioned in a desired attitude, the welding robots 26, 28 disposed on opposite sides of the vehicle body frame 12 are actuated to weld the vehicle body frame 12. At this time, inasmuch as the vehicle body frame 12 is positioned and held by the positioning robot 22 and the positioning jig holder mechanism 24, the vehicle body frame 12 does not swing while being welded, but remains highly accurately positioned in the welding process. For better operation efficiency, the attitude of the vehicle body frame 12 may be changed, and the welding process may be continued.

The positioning jig device for a vehicle body frame according to the present invention is also applicable to the positioning of vehicle frames other than those of four-wheel buggies, e.g., vehicle frames of three- and two-wheel vehicles.

According to the present invention, since the positioning jig is held by the positioning robot, and a vehicle body frame is supplied to and positioned in a working position, it is not necessary to provide dedicated jigs in respective working positions, and the cost entailed by jigs on a working line is greatly reduced.

Different vehicle body frames can easily be coped with by replacing the positioning jig held by the positioning robot.

The positioning attitude of the vehicle body frame in each working position can desirably be set by the positional control of the positioning robot depending on the type of the vehicle body frame.

Furthermore, since the positioning jig has its opposite ends held respectively by the positioning robot and the positioning jig holder mechanism, the vehicle body frame is positioned highly stably so as to be worked upon highly accurately.

The positioning jig device for a vehicle body frame according to the present invention is applicable to various vehicle bodies insofar as they have a frame structure.

The invention claimed is:

1. A positioning jig device for a vehicle body frame, comprising:
    a positioning jig for positioning and fixing the vehicle body frame;
    a positioning robot for holding a first end of said positioning jig, supplying said positioning jig to a working position for said vehicle body frame, and positioning said vehicle body frame in a desired attitude; and
    a positioning jig holder mechanism for holding a second end of said positioning jig, said positioning jig holder mechanism being disposed in said working position and having an engaging member which is detachably engageable with the second end of said positioning jig;
    wherein said engaging member is swingable and extendable based on a position of the second end of the positioning jig corresponding to a desired attitude of said vehicle body frame set by said positioning robot, and said vehicle body frame is positioned and fixed by said positioning jig.

2. The positioning jig device according to claim 1, wherein said positioning jig holder mechanism has a support by which said engaging member is swingably and retractably supported.

3. The positioning jig device according to claim 2, wherein said engaging member is supported by said support while being retractable with respect to the second end of said positioning jig through a resilient member in order to absorb shocks that are produced when the second end of said positioning jig engages with said engaging member.

4. The positioning jig device according to claim 2, wherein said support supports said engaging member for rotation about an axis along which said engaging member is displaceable.

5. The positioning jig device according to claim 2, wherein said support has an attitude securing member for securing the attitude of the support with respect to the second end of said positioning jig.

6. The positioning jig device according to claim 2, wherein said engaging member is actuatable by an actuating mechanism for engagement with the second end of said positioning jig.

7. The positioning jig device according to claim 1, wherein said positioning jig comprises a securing unit for positioning and fixing said vehicle body frame relative to said positioning jig.

8. The positioning jig device according to claim 1, wherein said positioning jig comprises a recess engageable by said engaging member of said positioning jig holder mechanism.

9. The positioning jig device according to claim 8, wherein said engaging member of said positioning jig holder mechanism comprises a plurality of teeth that fit into said recess for securely holding said positioning jig.

10. The positioning jig device according to claim 1, wherein said positioning robot comprises a multi-axis robot for setting said vehicle body frame to the desired attitude while the second end of said positioning jig is engaging said engaging member of said positioning jig holder mechanism.

11. The positioning jig device according to claim 1, including a welding robot disposed in said working position for welding said vehicle body frame which is positioned and fixed by said positioning jig.

12. The positioning jig device according to claim 1, wherein said positioning robot comprises a base and a first arm, a second arm, a third arm, a fourth arm, and a fifth arm, each of said arms being pivotally mountable to another and each having a specific axis of rotation, and wherein the first arm is mounted on said base.

13. The positioning jig device according to claim 12, wherein said positioning jig mechanism includes a support arm, pivotally mountable at an end of said support arm to at least one support post, and wherein said engaging member of said positioning jig mechanism is disposed at an opposite end of said support arm.

14. The positioning jig device according to claim 13, wherein, said support arm, said positioning jig, said fifth arm, and said fourth arm rotate along a same axis when said engaging member engages with said positioning jig.

15. A positioning jig device for a vehicle body frame, said device comprising:
- a positioning jig for positioning and fixing said vehicle body frame;
- a positioning robot for holding a first end of said positioning jig, supplying said positioning jig to a working position for said vehicle body frame, and positioning said vehicle body frame in a desired attitude; and
- a positioning jig holder mechanism for movably holding said positioning jig, said positioning jig holder mechanism being disposed in said working position and being operably connected to a second end of said positioning jig;
- wherein said positioning jig holder mechanism comprises an engaging member which is detachably engageable with the second end of said positioning jig, and wherein the second end of said positioning jig comprises a recess engageable by said engaging member of said positioning jig holder mechanism.

16. The positioning jig device according to claim 15, wherein said engaging member comprises two confronting sets of engaging arms, said engaging arms configured to move in a direction which is one of toward each other and away from each other upon actuation of said engaging member.

17. The positioning jig device according to claim 15, wherein said positioning jig holder mechanism has a support by which said engaging member is swingably supported and which supports said engaging member for displacement toward the second end of said positioning jig.

18. The positioning jig device according to claim 17, wherein said support has an attitude securing member for securing the attitude of said support with respect to the second end of said positioning jig.

19. The positioning jig device according to claim 17, wherein said engaging member is supported by said support for displacement toward the second end of said positioning jig through a resilient member in order to absorb shocks that are produced when the second end of said positioning jig engages with said engaging member.

* * * * *